United States Patent [19]

Willis

[11] Patent Number: 4,646,138

[45] Date of Patent: Feb. 24, 1987

[54] VIDEO SIGNAL RECURSIVE FILTER WITH LUMA/CHROMA SEPARATION

[75] Inventor: Donald H. Willis, Indianapolis, Ind.

[73] Assignee: RCA Corporation, Princeton, N.J.

[21] Appl. No.: 715,811

[22] Filed: Mar. 25, 1985

[51] Int. Cl.$^4$ ............................................. H04N 9/64
[52] U.S. Cl. ..................................... 358/36; 358/167
[58] Field of Search ................... 358/36, 37, 166, 167, 358/31

[56] References Cited

U.S. PATENT DOCUMENTS

| | | | |
|---|---|---|---|
| 4,064,530 | 12/1977 | Kaiser et al. | 358/36 |
| 4,240,106 | 12/1980 | Michael et al. | 358/36 |
| 4,268,855 | 5/1981 | Takahashi | 358/36 |
| 4,275,418 | 6/1981 | Trump et al. | 358/167 |
| 4,291,333 | 9/1981 | Warnock et al. | 358/36 |
| 4,296,436 | 10/1981 | Achiha | 358/167 |
| 4,305,091 | 12/1981 | Cooper | 358/36 |
| 4,361,853 | 11/1982 | Remy et al. | 358/167 |
| 4,388,729 | 6/1983 | Spencer et al. | 455/72 |
| 4,390,894 | 6/1983 | Raven | 358/36 |
| 4,392,123 | 7/1983 | Brüggemann | 340/347 |
| 4,485,403 | 11/1984 | Illetschko | 358/167 |
| 4,500,911 | 2/1985 | Ninomiya | 358/36 |
| 4,573,070 | 2/1986 | Cooper | 358/36 |

FOREIGN PATENT DOCUMENTS

| | | |
|---|---|---|
| 3150008 | 8/1983 | Fed. Rep. of Germany . |
| 2031686 | 3/1980 | United Kingdom . |
| 2102651 | 2/1983 | United Kingdom . |

OTHER PUBLICATIONS

H. Urkowitz, "Analysis and Synthesis of Delay Line Periodic Filters", IRE Trans. on Circuit Theory, Jun. 1957, pp. 41-53.

*Primary Examiner*—Michael A. Masinick
*Attorney, Agent, or Firm*—E. M. Whitacre; P. J. Rasmussen; E. P. Herrmann

[57] ABSTRACT

A motion adaptive recursive filter is modified to separate luminance or chrominance signal from composite video. The filter proportions and sums current and frame delayed signal recursively to provide signal-to-noise enhanced luminance signal with the chrominance component reduced to a steady state residual value the first frame after motion ceases. Current composite video signal is appropriately scaled and combined with the signal-to-noise enhanced signal to cancel the residual chrominance component therein.

16 Claims, 4 Drawing Figures

VIDEO SIGNAL RECURSIVE FILTER WITH LUMA/CHROMA SEPARATION

The present invention relates to reducing both noise and one of the chrominance or luminance components of a video signal.

BACKGROUND OF THE INVENTION

The use of recursive filters for reducing noise in video signals is relatively well known. Video recursive filters typically consist of a frame memory, two scaling circuits and an adder circuit. Incoming or current video signal is scaled by one of the scaling circuits and the scaled video signal is applied to one input port of the adder. Signal delayed by substantially one frame period from the output of the frame memory is scaled in the other of the scaling circuits and applied to a second input port of the adder. Video signal sums produced by the adder are coupled to the input of the frame memory and represent noise-reduced video.

The foregoing description applies if the video signal is a monochrome or luminance signal. If the video signal is a chrominance component of composite video a signal chrominance phase inverter must be interposed between the adder circuit and the frame memory. Finally, if the video signal to be processed is composite video, and the desired system output signal is noise reduced composite video signal, then circuitry must be inserted between the adder and frame memory to invert the phase of the chrominance component only, of the noise-reduced composite video signal. An example of this type of video recursive filter is disclosed in U.S. Pat. No. 4,064,530 entitled "Noise Reduction System For Color Television".

A recursive filter, which does not have provision for chrominance phase inversion, and to which composite video is applied tends to produce a noise reduced luminance component with a small amount of residual chrominance contamination after the occurrence of a number of frame periods in which there is no interframe image motion. Thus, a video recursive filter may be employed to partially separate the luminance component from composite video signal for non-moving images. Such a system has limited utility.

It is an object of the present invention to provide luminance/chrominance separation from composite video signal without residual cross components using a recursive filter system.

It is a further object to adaptively control a luminance/chrominance separating recursive filter to rapidly reach steady state operation following cessation of interframe image motion.

SUMMARY OF THE INVENTION

A system according to the invention is a video signal recursive filter system which includes a delay or storage device for storing a noise-reduced video signal and a summing device for adding a portion of the stored signal to a portion of the current or incoming video signal to produce noise-reduced video signal. A signal combining circuit is arranged to subtract a further portion of current video signal from the noise-reduced video signal to produce a noise-reduced video signal having a predetermined component of the video signal substantially eliminated.

DETAILED DESCRIPTION

Figure 1:
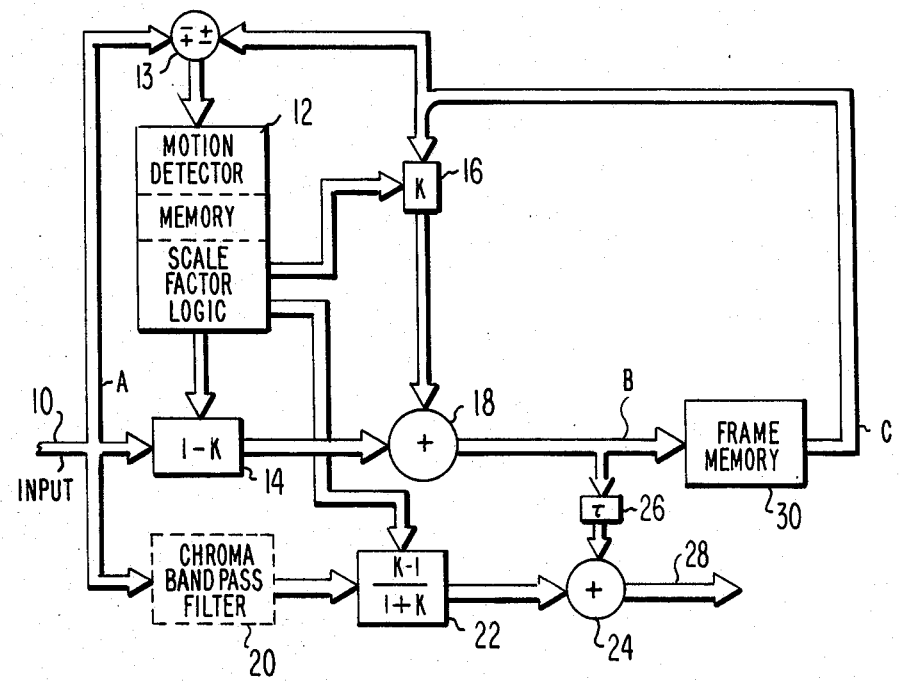
FIGS. 1-3 are block diagrams of alternate embodiments of noise recursive filter systems embodying the present invention.

Although the noise reducing system of the invention is useful for processing video signals developed in accordance with conventional TV signal standards, with e.g. appropriate selection of memory size, the invention will be described as applied to the NTSC television standard. It is to be understood that the system may be implemented in either the analog or the digital domain, however, a digital implementation of the system will be described. In the drawing, interconnections constructed with broad arrows represent multiconductor connections for parallel-bit digital signals. Interconnections drawn with narrow arrows represent single conductor connections.

Referring to FIG. 1, digital video signal to be processed is applied to input port 10 and noise reduced signal is available at output port 28. The input video signal may be baseband composite video signal from an analog-to-digital converter (not shown) or it may be, for example, luminance signal with incompletely cancelled chrominance signal therein. For either input signal the output signal is noise-reduced luminance signal with the chrominance component removed.

The input video signal at input port 10 is coupled to a scaling circuit 14 which scales the input video signal by a factor (1-K). The scaled input signal is coupled to one input port of adder 18. The output port of adder 18 is coupled to the input port of a delay or memory device 30 which delays signal by substantially one frame period wherein a frame comprises two fields of NTSC video signal. Delayed signal from memory 30 is coupled to scaling circuit 16 which scales the delayed signal by a factor K. The scaled and delayed signal is applied to a second input port of adder 18. The delay period provided by memory 30 is selected so that the two signals applied to adder 18 are separated in time by precisely one frame period (or a multiple of frame periods).

If the signals at input port 10, the output port of adder 18 and the output port of memory 30 are designated $S_A$, $S_B$ and $S_C$ respectively, then the signal $S_B$ is given by $$S_B = (1-K)S_A + KS_C. \tag{1}$$

The signal $S_C$ is equal to the signal $S_B$ generated during the previous frame period. Thus, if the current frame is designated frame n, and the current signal, $S_B$, is written as $S_{Bn}$, then the signal $S_C$ is equal to the signal $S_{B(n-1)}$. The signal $S_{B(n-1)}$ is given by the equation $$S_{B(n-1)} = (1-K)S_{A(n-1)} + KS_{C(n-1)} \tag{2}$$
$$= (1-K)S_{A(n-1)} + KS_{B(n-2)}$$

and the signals $S_{B(n-i)}$ may be expressed in similar fashion. Substituting the values of $S_{C(n-i)}$ into equation (1) produces the result $$S_{Bn} = (1-K)S_{An} + K(1-K)S_{A(n-1)} + K^2(1-K)S_{A(n-2)} + \ldots K^i(1-K)S_{A(n-i)} + \ldots \tag{3}$$

If the input signal $S_A$ is composite video signal, it consists of luminance, Y, chrominance, C and noise, N, components so that the signal $S_A$ is more properly represented $$S_A = Y_A + C_A + N_A \qquad (4)$$

and each component should be evaluated separately with respect to equations (1)–(3). The luminance component, for a given pixel, in the absence of interframe motion, has in fact the same value from frame to frame. Substituting the Y component of the samples for S in equation (3), and since all of the $Y_{A(n-i)}$ samples will be equal for no motion, equation (3) reduces to $$Y_B = Y_A(1-K)(1+K+K^2+K^3+K^n+\ldots). \qquad (5)$$

As n gets large, the series reduces to $1/(1-K)$ and equation (5) becomes $$Y_B = Y_A(1-K)/(1-K) = Y_A. \qquad (6)$$

The chrominance component is 180 degrees out of phase from frame to frame. If values for the chrominance component $C_i$ are substituted for the sample values $S_i$ in equation (3) the polarity of the terms in the series alternate. For the chrominance component equation (3) reduces to $$C_B = C_A(1-K)(1-K+K^2-K^3+\ldots K^n+\ldots). \qquad (7)$$

In the limit as the number of $K^i$ terms approach infinity the series with alternating signs tends towards the value $1/(1+K)$. Substituting this value for the series in equation (7), in the limit becomes the chrominance component $$C_{Bi} = C_i(1-K)/(1+K) \qquad (7)$$

which for K approaching 1 becomes small but is significant if it contaminates a luminance signal.

Noise is considered differently since noise samples from frame to frame are not coherent regardless of the state of interframe image motion or non-motion. The assumption is made that the noise components of all of the samples have approximately equal RMS values. Noise power adds as the sum of the squares of the respective noise components and the RMS amplitude is the square root of the sum of the squares. The noise value $N_B$ is determined by substituting the noise component samples into equation (3) with each term squared. After simplifying, the result is $$N_B(RMS) = N(RMS)(1-K)\sqrt{1+K^2+K^4+K^6+K^{2n}}. \qquad (9)$$

The series under the radical for n large approaches the value $1/(1-K^2)$ so that equation (9) reduces to $$N_B(RMS) = N(RMS)\sqrt{(1-K)/(1+K)}. \qquad (10)$$

The luminance signal to noise improvement at point B in the FIG. 1 circuit approaches $\sqrt{(1+K)/(1-K)}$ which is large for K approaching 1.

The residual chrominance signal is removed from the noise-reduced luminance signal by combining a portion of the input chrominance component with the noise-reduced signal. This is accomplished in the FIG. 1 circuit by applying the input signal at port 10 to the filter 20 which passes only those signal components in the band of frequencies normally occupied by chrominance signal. The chrominance signal from filter 20 is scaled in element 22 by the factor $(K-1)/(1+K)$ and then combined with the noise reduced luminance in adder 24.

The residual chrominance in the luminance signal has an amplitude of $C_{in}(1-K)/(1+K)$ from equation (8) while the chrominance signal from element 22 is $C_{in}(K-1)/(1+K)$ which, when the two are additively combined, cancel leaving noise reduced luminance. Note that delay element 26 coupling signal from adder 18 to adder 24 compensates for sample processing delays incurred in filter 20.

The foregoing analysis assumed that there was no interframe image motion. When motion occurs it is generally accepted that a recursive filter produces undesirable results. In the FIG. 1 system recursive filtering is inactivated when interframe image motion is detected. This is accomplished by changing the value of K to zero which effectively disconnects the feedback from memory 30 and couples input signal from port 10 via adder 18 to adder 24 scaled by the factor "1" and via filter 20 to adder 24 scaled by the factor "−1". The chrominance component at point B is in phase with the chrominance component of the signal output of filter 20. The in-phase chrominance from filter 20 is subtracted from the chrominance component in the signal passed by adder 18 leaving only a luminance component and a noise component an output bus 28. The FIG. 1 circuit operates as a band stop filter to eliminate the chrominance component from the input video signal during motion.

Band-pass filter 20 is incorporated to provide low-pass filtered luminance during motion intervals. However, during non-motion intervals filter 20 is not necessary to the circuit. In these intervals, the input signal may be coupled directly to scaling circuit 22. In this instance the amplitude of the luminance component at output port 28 is reduced from the amplitude of the luminance component of the input signal. The amplitude of the luminance component at output 28 can be restored by appropriately amplifying the output signal.

Generally the signal-to-noise ratio of video signals is sufficiently acceptable so the viewer will readily tolerate a time interval for the system to converge to the desired signal-to-noise improvement. This is not so with regard to chrominance contamination of luminance signal. The elimination of chrominance should be realizable during the first frame of no image motion. The first frame of no image motion is defined herein as the frame period in which the image content of the current input frame is the same as the image content of the immediately preceding frame. This criterion is applied on a pixel basis. In other words, with regard to the overall image there may be areas of interframe image motion. However, each pixel, frame-to-frame, is processed independently of all other pixels. The term "frame of no image motion" thus applies to each pixel independently of the condition of motion or non motion of other pixels.

The elimination of chrominance may be accomplished if the chrominance component at point B is forced to converge to a steady state value in the first frame of no motion. This condition is achieved with the use of three values of K for scaling circuits 14 and 16; the first value, $K_1$, is used during image motion; the second value, $K_2$, is used during the first frame of no motion and the third value, $K_3$, is used for all succeeding frames of no motion. The value of $K_1$ is equal to zero to inactivate the recursive filter part of the system and to lead incoming signal directly to the frame memory to insure that information is available to detect the cessation of motion. The value of $K_3$ is selected to provide the desired steady state signal-to-noise improvement. The selection of $K_3$ involves a trade-off between the extent of signal-to-noise achieveable, and the time required to achieve it and also the subjective difference between the signal-to-noise ratio of moving image objects versus that of non moving image objects. The value $K_2$ required to produce a steady state chrominance component at point B and consequently to permit elimination of chrominance in all frames of no motion is given by $$K_2 = 1/1 + K_3. \tag{9}$$

Only two values are required for the scale factor K in the scaling circuit 22 and these values are zero for motion periods and $K_3$ for all non-motion periods.

The scale factors are selected at the pixel rate or a small submultiple of the pixel rate. The values of K are dependent on interframe motion and the history of interframe motion.

Differences between the luminance component of samples from successive frames are an indication that motion or no motion has occurred between frames. These differences are provided by subtractor 13 having its minuend and subtrahend inputs connected to the input port 10 and the output of memory 30. The differences are coupled to a motion detector-scale factor generator 12 which produces the respective scale factors for scaling circuits 14, 16 and 22. An exemplary motion detector scale factor generator will be described below with reference to FIG. 4.

Figure 2:
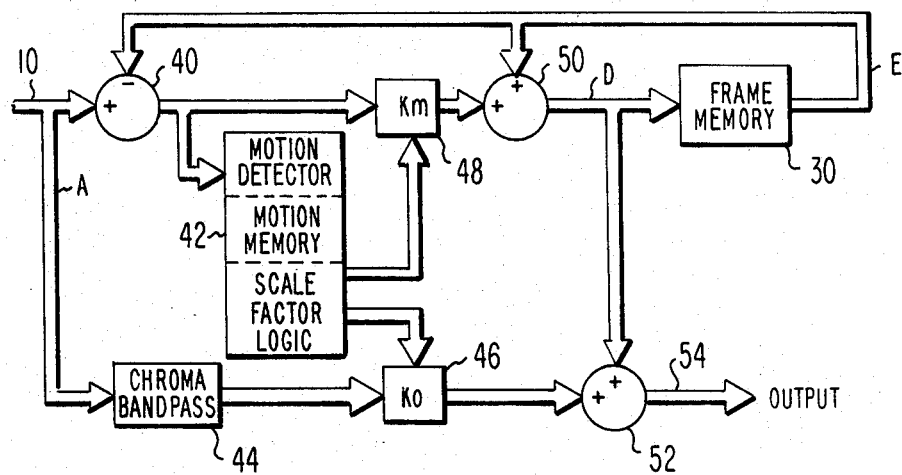

FIG. 2 is an alternative recursive filter-noise reducing system. Input video samples, $S_A$, are applied at input port 10 and coupled to subtracter 40. Delayed samples $S_E$, from memory 30, are coupled to a second input port of subtracter 40 which produces the difference samples $(S_A - S_E)$. The respective samples $S_A$ and $S_E$ correspond to like pixels of successive image frames. The difference samples $(S_A - S_E)$ are applied to a scaling circuit 48 which produces scaled difference samples $K_m(S_A - S_e)$ where $K_m$ is a scale factor. The scaled difference samples and the delayed samples $S_E$ are applied to an adder 50 which produces sample sums $S_D$ given by the equation $$S_D = K_m(S_A - S_E) + S_E \tag{11}$$
$$= K_m S_A + S_E(1 - K_m).$$

During periods of interframe image motion the scale factor $K_m$ is set to one and from equation (11) it is seen that the samples $S_D$ are equal to the input samples $S_A$. After e.g. two frames of no motion the scale factor $K_m$ is set to a value $K_{m3}$. If no motion persists for a relatively large number of frame intervals it can be shown that the noise component $S_{DN}$ at the output of adder 50 converges to the value $$S_{DN}(RMS) = S_N(RMS)\sqrt{K_{m3}/(2 - K_{m3})}. \tag{12}$$

To insure that the chrominance component converges to a steady state value at the first frame of no motion, the scale factor $K_m$ is set to a value $K_{m2}$ during the first frame of no motion. The value of $K_{m2}$ is given by $$K_{m2} = 1/(2 - K_{m3}). \tag{13}$$

and the steady state chrominance component $S_{DC}$ is given by $$S_{DC} = S_{AC} K_{m3}/(2 - K_{m3}). \tag{14}$$

The luminance component $S_{DY}$, in the steady state, is equal to the luminance component at the input $S_{AY}$.

Input samples at port 10 are applied to a chrominance band-pass filter 44 which passes the chrominance component $S_{AC}$, a luminance component $S_{AYH}$ which corresponds to the luminance signal in the chrominance band of frequencies, and a noise component to a scaling circuit 46 which scales the samples by a factor $K_0$. The scaled samples $K_0(S_{AC} + S_{AYH} + S_{AN})$ are coupled to adder 52. Samples $S_D$, consisting of components $S_{DY}$, $S_{DC}$ and $S_{DN}$ from adder 50, are coupled to a second input port of adder 52 which develops the system output signal $S_0$ given by $$S_0 = S_{DY} + S_{DC} + K_0 S_{AC} + K_0 S_{AYH} + S_{ON}. \tag{15}$$

The chrominance component of samples $S_0$ are reduced to zero by setting the scale factor $K_0$ to the value $-K_{m3}/(2 - K_{m3})$.

The lower frequency luminance component of samples $S_0$ is equal to the luminance component samples $S_{DY}$. The luminance component $S_{OYH}$ of samples $S_0$, in the chrominance frequency spectrum is equal to $S_{AYH}(2(1 - K_{m3})/(2 - K_{m3}))$. This is an undesirable reduction in high frequency luminance, however, the amplitude may be restored by selectively peaking the output signal.

The noise component $S_{ON}$ is developed from noise contributions passed through scaling circuit 46 and from the output of adder 50. Assuming the worst case i.e. that band-pass filter 44 passes all of the input noise component, the output noise component can be shown to be $$S_{ON}(RMS) = S_{AN}(RMS)\sqrt{2K_{m3}(1 - K_{m3})/(2 - K_{m3})} \tag{16}$$

The ratio of the output noise component $S_{ON}$ to the noise component $S_{DN}$ is equal to $\sqrt{2(1 - K_{m3})/(2 - K_{m3})}$ which is less than 1 for all values of $K_{m3}$ less than 1.

In the FIG. 2 system the difference samples produced by subtracter 40 contain interframe motion information. These differences are applied to a motion detector-scale factor generator circuit 42 which develops the scale factors for scaling circuits 46 and 48 on e.g. a pixel-by-pixel basis i.e. a sample-by-sample basis. Exemplary scale factors produced by circuit 42 are illustrated in Table I.

TABLE I

| MOTION | FRAME | $K_m$ | $K_O$ |
|---|---|---|---|
| Yes | X | 1 | −1 |
| No | 1$^{st}$ after motion | $1/(2 - K_{m3})$ | $-K_{m3}/(2 - K_{m3})$ |
| No | n$^{th}$ after motion | $K_{m3}$ | $-K_{m3}/(2 - K_{m3})$ |

In Table I, the value $K_{m3}$ will be some small value such as ⅛, 1/16 or 1/32.

The FIG. 2 system like the FIG. 1 system reverts to a chrominance band stop or notch filter between the input and output ports during motion intervals.

Figure 3:
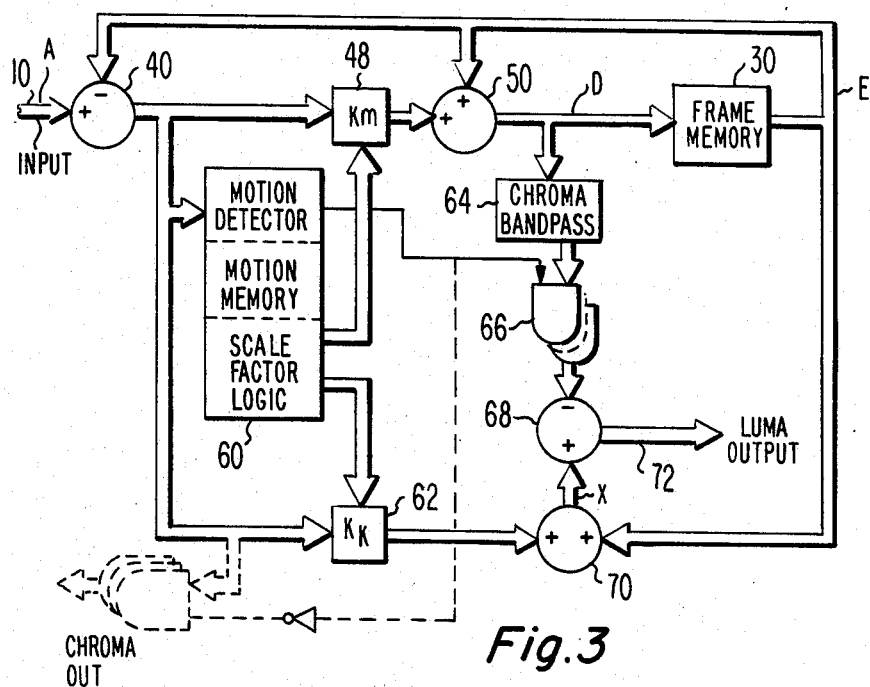

FIG. 3 is a variation of the FIG. 2 system. Elements of the FIG. 3 circuit designated with like numbers of the FIG. 2 circuit are similar devices.

In FIG. 3 sample differences ($S_A - S_E$) from subtracter 40 are applied to scaling circuit 62 which produces scale sample differences $K_K(S_A - S_E)$. The scaled sample differences are coupled to adder 70 wherein they are summed with samples $S_E$ from frame memory 30. The sums, $S_X$, from adder 70, in the absence of motion, are coupled unchanged via subtracter 68 to the luminance output port 72 and are expressed by $$S_X = K_K(S_A - S_E) + S_E \quad (17)$$
$$= K_K S_A + (1 - K_K) S_E.$$

In the absence of motion, the luminance component of $S_A$ is equal to the luminance component of $S_E$. From equation (16) it is seen therefore, that the output luminance component $S_{XY}$ is equal to the input luminance component $S_{AY}$ regardless of the value of $K_K$. The higher frequency luminance component output by adder 70 are not attenuated as are the higher frequency luminance components output by the FIGS. 1 and 2 circuits.

The first frame of no motion $K_K$ is set to one-half. The magnitude of the chrominance components of $S_A$ and $S_E$ will be equal but they will be anti-phase. Thus, during this frame interval the system performs as a luminance frame comb filter and the chrominance component output by adder 70 is zero.

If the value of $K_m$ for the first frame of no motion is selected to cause the chrominance component of $S_D$ to converge immediately, then with respect to the chrominance component $S_{XC}$ in the second frame of no motion, equation (18) becomes $$S_{XC} = K_K S_{AC} + (1 - K_K) S_{EC} \quad (18)$$
$$= K_K S_{AC} + (1 - K_K)(-K_{m3}/(2 - K_{m3})) S_{AC}.$$

The chrominance component $S_{XC}$ will equal zero for $K_K$ equal to one-half for the first frame of no motion and $K_{m3}/2$ for all succeeding frames of no motion.

The RMS value of the noise component $S_{XN}$ converges toward the RMS input noise value times the square root of ($K_{m3}/2$), which is smaller than the value of the noise component of the samples $S_D$ for small $K_{m3}$ and approaches the value $1\sqrt{2}$ times the noise component of sample $S_D$ for $K_{m3} = 1$. The noise component $S_{XN}$ for the first frame of no motion is equal to the RMS value of the input noise divided by the square root of two.

The value of the scale factor $K_K$ is set to "1" during interframe image motion. From equation (17) it is seen that the output signal $S_X$ is equal to the input signal $S_A$. Similarly from equation (11) the signal $S_D$ is equal to $S_A$ (for $K_m = 1$). The signal $S_D$ is applied to a band-pass filter 64 which extracts the chrominance component. The chrominance component $S_{DC} = S_{AC}$ is coupled during interframe image motion periods to the subtrahend input of subtracter 68 by the gating circuit 66. The chrominance component of signal $S_X$ is cancelled in subtracter 68 by the chrominance signal component $S_{DC}$. The control for gating circuit 66 may be provided by the motion detector 60. In effect, the FIG. 3 circuit reverts to a band stop filter for chrominance signal during image motion.

Chrominance signal with a reduced luminance component may be developed by subtracting the luminance output signal $S_{XY}$ from appropriately delayed composite video signal from input 10. It is noted that during no motion periods the difference signals from subtracter 40 consists substantially of a chrominance signal whose amplitude is slightly larger than the amplitude of the input chrominance component.

Table II lists the scale factors $K_m$ and $K_K$ as well as the gate control for the different conditions of interframe image motion for the FIG. 3 system.

TABLE II

| MOTION | FRAME | $K_m$ | $K_K$ | GATE 66 CONTROL |
|---|---|---|---|---|
| Yes | X | 1 | 1 | ON |
| No | 1$^{st}$ frame no motion | $1/(2 - K_{m3})$ | 1/2 | OFF |
| No | n$^{th}$ frame no motion | $K_{m3}$ | $K_{m3}/2$ | OFF |

The FIG. 3 circuitry may be slightly rearranged to provide a further alternative embodiment. In such alternate embodiment the signal input port of the scaling circuit 62 may be coupled to the output of scaling circuit 48 rather than the output of subtracter 40. The values of the scale factor $K_K$ must be appropriately changed so that the product of scale factors, $K_m K_K$, equal the respective values in Table II listed under the column headed $K_K$. For example, new values of $K_K$ are 1, $(2-K_{m3})/2$ and ½ for no motion, the first frame post motion and steady state respectively.

In designing the FIG. 1-3 systems it may be necessary to interpose compensating delays in certain of the signal paths. Those skilled in the art of circuit design will readily recognize such requirements and be able to implement them.

The systems have been described in terms of primarily producing a noise-reduced luminance signal from composite video signal or from a luminance input signal containing chrominance contamination. With slight alterations the system can be arranged to, for example, produce a noise reduced chrominance signal from composite video. This may be accomplished in the FIG. 3 system by changing subtracter 40 to an adder and adders 50 and 70 to subtracters.

This may be understood by assuming that the composite video signal is sampled synchronous to the color burst reference and at four times the color subcarrier frequency. If the sampling phase is selected to coincide with the I and Q color difference signal axes the sequence of samples may be represented $Y_1 - I_1$, $Y_2 + Q_2$, $Y_3 + I_3$, $Y_4 - Q_4$, $Y_5 - I_5$, $Y_6 + Q_6$, $Y_7 + I_7$, $Y_8 - Q_8$, ... Corresponding samples on adjacent frame, because chrominance is inverted, may be represented $Y_1 + I_1$, $Y_2 - Q_2$, $Y_3 - I_3$, $Y_4 + Q_4$, $Y_5 + I_5$, $Y_6 - Q_6$, $Y_7 - I_7$, $Y_8 + Q_8$ ... If the luminance and I, Q magnitudes of corresponding samples in the two sequences (frames) are equal (i.e. for no interframe motion), and the samples from the first sequence are added to corresponding samples in the second sequence, the luminance components, Y, will combine constructively but the I, Q components will cancel. The system of FIG. 3 operates on this principle to produce the luminance output signal. In FIG. 3, the first sequence may be considered to correspond to the samples $S_A$ and the second sequence to correspond to samples $S_E$.

Now consider complementing (inverting) the samples in the second sequence. The complemented sequence will have relative values represented by $-(Y_1+I_1)$, $-(Y_2-Q_2)$, $-(Y_3-I_3)$, $-(Y_4+Q_4)$, $-(Y_5+I_5)$, $-(Y_6-Q_6)$, $-(Y_7-I_7)$, $-(Y_8+Q_8)$ ... which may be rewritten $-I_1-Y_1$, $Q_2-Y_2$, $I_3-Y_3$, $-Q_4-Y_4$, $-I_5-Y_5$, $Q_6-Y_6$, $I_7-Y_7$, $-Q_8-Y_8$ .... Comparing this latter sequence with the first sequence it will be seen that corresponding I, Q component samples are all in phase i.e. have like polarities while the luminance component samples have opposite polarity. Thus, if the complemented version is applied as signal $S_E$ in the FIG. 3 system, the I, Q components will combine constructively and the luminance component will cancel. The effect of complementing the signal $S_E$, i.e. the output of frame memory 30 may be realized by complementing the inputs to subtracter 40 and adders 50 and 70 to which the samples $S_E$ are coupled. But this is the same as changing subtracter 40 to an adder, and adders 50 and 70 to subtracters with the samples $S_E$ coupled as subtrahends to the subtracters.

The chrominance signal i.e. the I and Q color difference signals, has significantly less bandwidth than the luminance signal. In a recursive filter arranged to produce the chrominance signal it is therefore not necessary to use all of the samples of the foregoing sequences and, thus, the size of the frame memory 30 can be reduced. For example two samples, one containing an I component and one containing Q component, from each set of four successive samples may be selected and processed. If this is done, however, provision must be made to select samples of opposite I, Q phase in alternate frames. For example, if the samples $Y_1-I_1$, $Y_2+Q_2$, $Y_5-I_5$, $Y_6+Q_6$ etc. are selected from the first sequence then samples $Y_1+I_1$, $Y_2-Q_2$, $Y_5+I_5$, $Y_6-Q_6$ etc. must be selected from the second sequence.

Similar modifications can be made to the FIGS. 1 and 2 systems.

Figure 4:
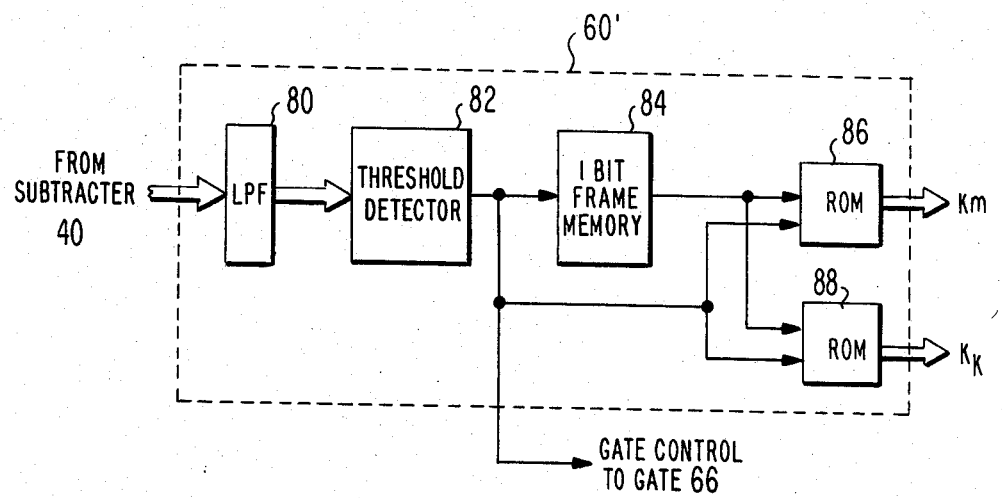
FIG. 4 is a block diagram of exemplary circuitry for generating scale factors for application to the scaling circuits in FIGS. 1-3.

FIG. 4 shows an exemplary motion detector-scale factor generator. The circuitry shown is directed toward the FIG. 3 system but with modifications that will be immediately apparent to those skilled in the art of circuit design can be made applicable to the FIGS. 1 and 2 systems.

Sample differences from subtracter 40 are applied to a low-pass filter 80 to remove the chrominance component. This is necessary since chrominance has a 180 degree phase difference from frame-to-frame and, thus, combines constructively in subtracter 40 rather than providing the difference of the chrominance magnitudes. The low-pass filtered differences are applied to a threshold detector which generates a logic one for the magnitude, i.e. the absolute value, of the differences being greater than a predetermined value and generates a logic zero for the magnitude of the differences being less than this value. The predetermined value or threshold is established to provide a degree of noise immunity in the detection of motion and will be determined by user or designer preference.

Motion signal from detector 82 is coupled to the data input port of the memory device 84 which delays the motion signal by one frame period. Delayed motion signal from the memory device 84 and motion signal from the detector 82 are coupled to the address input ports of the ROM's 86 and 88 which are programmed to output the requisite scale factors for the motion states applied to their address input ports. Table III is an exemplary state table for the FIG. 3 system.

TABLE III

| FRAME | MOTION | DETECTOR 82 OUTPUT | MEMORY 84 OUTPUT | GATE CONTROL | $K_m$ | $K_K$ |
|---|---|---|---|---|---|---|
| N − 3 | YES | 1 | X | ON | 1 | 1 |
| N − 2 | YES | 1 | 1 | ON | 1 | 1 |
| N − 1 | NO | 0 | 1 | OFF | $1/(2 - K_{m3})$ | 1/2 |
| N | NO | 0 | 0 | OFF | $K_{m3}$ | $K_{m3}/2$ |
| N + 1 | YES | 1 | 0 | ON | 1 | 1 |

Table III is developed around a time sequence of frames running from top to bottom. The condition of interframe image motion was selected to provide all possible 2-bit address states to the ROM's 86 and 88. The columns labeled "Detector 82 Output" and "Memory 84 Output" taken together form the address codes for the ROM's 86 and 88. Note the value $K_{m3}$ is selected arbitrarily in accordance with the desired system response time and degree of noise reduction.

For adaptation to the FIGS. 1 and 2 noise-reducing systems, ROM's 86 and 88 will be programmed with the appropriate scale factors or scale factor control signals as described with reference to the FIGS. 1 and 2 systems.

What is claimed is:

1. A recursive filter system, for processing video signals including luminance and chrominance components and noise, which video signal is formatted in frame periods, comprising:

a recursive filter for combining a portion of current video signal with a portion of combined signal from previous frames of video signal and which develops a processed video signal wherein the amplitude of said noise is reduced, and the amplitude of one of the processed luminance and chrominance components of said video signal is substantially reduced with respect to the amplitude of the other of said processed luminance and chrominance components; and signal cancelling means for combining a portion of current video signal with a portion of said processed video signal from said recursive filter to substantially cancel the one of said processed luminance and chrominance components which is substantially reduced and developing an output signal wherein the signal-to-noise ratio of the other of said luminance and chrominance components is enhanced with respect to current video signal.

2. The system set forth in claim 1 wherein the recursive filter comprises:
  delay means having input and output ports for delaying signal by substantially one frame period;
  signal combining means having an output coupled to the input port of said delay means and having first and second input ports;
  a first variable scaling circuit having an input port coupled to the output port of said delay means and an output port coupled to one of the input ports of said combining means, and having a control input port;
  a second variable scaling circuit having an input port for applying current video signal, an output port coupled to the other input port of said combining means and having a control input port;
  a motion detector responsive to current video signal and delayed signal from said delay means for developing a motion signal;
  a scale factor generating circuit coupled to said motion detector for developing control signals corresponding to scale factors K and $(1-K)$ for application to the respective control input ports of said first and second variable scaling circuits and wherein K is selected to have one value when motion is detected and at least one other value in the absence of motion.

3. The system set forth in claim 2 wherein said signal cancelling means comprises:
  a further signal combining means having an output port from which noise reduced video signal is available, having a first input port coupled to the output port of said signal combining means, and having a second input port;
  a third variable scaling circuit having a control input port coupled to said scale factor generating circuit, having an output port coupled to the second input port of said further signal combining means and having an input port; and
  means for coupling the input port of said third variable scaling circuit to receive said current video input signal.

4. The system set forth in claim 3 wherein the means for coupling the input port of said third variable scaling circuit includes a filter for attenuating signal having frequencies outside the band of frequencies normally occupied by said chrominance component.

5. The system set forth in claim 3 wherein said scale factor generating means applies control signals corresponding to scale factors including 0, 1 and $-1$ to the first, second and third scaling means respectively when motion is detected and scale factors of K, $1-K$ and $(K-1)/(K+1)$ to the first, second and third scaling means respectively for frame periods of no motion where K is a value less than one.

6. The system set forth in claim 5 wherein said scale factor generating means applies control signals corresponding to scale factors of $K_3$, $K_3/(1+K_3)$ and $(K_3-1)/(K_3+1)$ to the first, second and third scaling means for the first frame of no motion where $K_3$ has a value less than 1.

7. The system set forth in claim 1 wherein said recursive filter comprises:
  delay means having input and output ports, said delay means for delaying signals by substantially a multiple including one, of frame periods;
  first signal combining means havng a first input port coupled to the output port of said delay means, having an output port coupled to the input port of said delay means and having a second input port;
  a variable scaling circuit having a control input port for applying control signals corresponding to scale factors, and having an output port coupled to the second input port of said first signal combining means;
  a second signal combining means having a first input port for applying said video signal, a second input port coupled to the output port of said delay means and having an output port coupled to the input port of said scaling circuit;
  a motion detector having an input port coupled to the output port of said second signal combining means for generating control signals which are coupled to said scaling means; and
  wherein noise reduced video signal is available from the output ports of said first combining means and said delay means.

8. The system set forth in claim 7 wherein said signal cancelling means includes:
  a further scaling circuit having an input port for applying said video signal, having a control input port coupled to said motion detector for applying control signals corresponding to scale factors, and having an output port;
  a further signal combining means having a first input port coupled to the output port of said first signal combining means, a second input port coupled to the output port of said further scaling circuit and having an output port at which noise reduced video signal is available wherein one of said luminance and chrominance components is substantially eliminated.

9. The system set forth in claim 8 wherein said video signal is coupled to the input port of said further scaling circuit via a filter having a pass-band for passing frequencies normally occupied by said chrominance component.

10. The system set forth in claim 8 wherein said motion detector applies control signals corresponding to scale factors including 1 and $-1$ to said scaling circuit and said further scaling circuit respectively when motion is detected and $K_3$ and $-K_3/(2-K_3)$ to said scaling circuit and said further scaling circuit respectively when no motion is detected, and where the magnitude of $K_3$ is a value less than one.

11. The system set forth in claim 10 wherein said motion detector applies control signals corresponding to scale factors $1/(2-K_3)$ and $-K_3/(2-K_3)$ to said scaling circuit and said further scaling circuit respectively for the first frame of no motion.

12. The system set forth in claim 7 wherein said signal cancelling means includes:
  a further signal combining means having a first input port coupled to the output port of said delay means, having a second input port and having an output port at which noise reduced video signal is available which noise reduced video signal has one of said luminance and chrominance components substantially eliminated;
  a further scaling circuit having a control input port coupled to said motion detector for applying control signals corresponding to scale factors, having an output port coupled to the second input port of said further signal combining means, and having an input port coupled to the output port of said second signal combining means.

13. The system set forth in claim 12 wherein said motion detector is configured to apply control signals corresponding to scale factors including 1 and +1 to the scaling circuit and further scaling circuit respectively when motion is detected and $K_3$ and $K_3/2$ to the scaling circuit and further scaling circuit respectively when no motion is detected, and where the magnitude of $K_3$ is a value less than one.

14. The system set forth in claim 13 wherein said motion detector is configured to apply control signals corresponding to scale factors of $1/(2-K_3)$ and $\frac{1}{2}$ to said scaling circuit and said further scaling circuit respectively during the first frame of no motion.

15. A recursive filter system for processing video signals including luminance and chrominance and noise components, which video signals is formatted in frame periods, comprising:
  an input terminal for applying said video signals;
  delay means for producing delayed replicas of signal applied thereto;
  means having input and output ports coupled respectively to said input terminal and said delay means, for combining a portion of said video signals with a portion of said delayed replicas and having a control input port for applying control signals to establish the respective portions of said video signal and said delayed replicas that are combined;
  means coupled to said input terminal and said delay means for generating said control signals responsive to interframe differences indicative of motion between images represented by said video signals and said delayed replicas, and wherein said control signals program said combining means to produce one of said luminance and chrominance components having a substantially attenuated steady state amplitude and an attenuated noise component in the first frame of no motion.

16. The system set forth in claim 15 further including:
  scaling means coupled to the input terminal and to said means for generating said control signals for scaling said video signals; and
  further combining means coupled to said scaling means and one of said combining means and said delay means for combining said scaled video signals and signals produced by said one of said combining means and said delay means to produce an output signal wherein said one of said luminance and chrominance components is substantially eliminated.

* * * * *